US006081714A

United States Patent [19]

Wakizaka

[11] Patent Number: 6,081,714

[45] Date of Patent: Jun. 27, 2000

[54] LOW TRAFFIC HANDOFF METHOD FOR CDMA CELLULAR NETWORK USING DIFFERENT FREQUENCIES AMONG BASE STATIONS

[75] Inventor: Yoshiki Wakizaka, Tokyo, Japan

[73] Assignee: NEC Corporation, Tokyo, Japan

[21] Appl. No.: 09/084,779

[22] Filed: May 27, 1998

[30] Foreign Application Priority Data

May 28, 1997 [JP] Japan .................................. 9-138138

[51] Int. Cl.[7] .............................. H04Q 7/00; H04B 1/06

[52] U.S. Cl. ......................... 455/437; 455/427; 455/435; 455/436; 455/439; 370/331; 370/335

[58] Field of Search .................................. 455/427, 435, 455/436, 439, 441, 447, 437; 370/331, 335

[56] References Cited

U.S. PATENT DOCUMENTS

| | | | |
|---|---|---|---|
| 5,594,718 | 1/1997 | Weaver, Jr. et al. | 370/331 |
| 5,649,000 | 7/1997 | Lee et al. | 455/436 |
| 5,697,055 | 12/1997 | Gilhousen et al. | 455/33.2 |

*Primary Examiner*—Wellington Chin
*Assistant Examiner*—Sheila B. Smith
*Attorney, Agent, or Firm*—McGinn & Gibb, P.C.

[57] ABSTRACT

In a CDMA cellular network where base stations share a common frequency and a first base station has a second frequency in addition to the common frequency, a mobile station receives a pilot signal from the first base station over the second frequency when it has established a connection to it, and transmits a first handoff request when the field strength of the pilot signal drops below a predefined threshold. In response, the first base station returns a change-frequencies command to the mobile station to cause it to switch to the common frequency and receive pilot signals from more than one base station over the common frequency. The mobile station transmits a second handoff request message containing a list of field strengths of the pilot signals. In response, the first base station makes a search through the list of field strengths and returns a handoff command to the mobile station and a connection setup command to a control station if a second base station appropriate for handoff is found. The control station responds to the connection setup command message from the first base station for instructing the second base station to establish a connection to the mobile station. The mobile station responds to the handoff command message from the first base station for instructing the second base station to transmit a connection setup complete message to the control station, which responds to it by instructing the first base station to clear the connection to the mobile station.

6 Claims, 5 Drawing Sheets

BASE STATION

START

30 HANDOFF REQUEST ? — NO
31 YES — SEARCH FOR BASE STATION USING FIELD STRENGTHS DATA
32 NEXT BASE STATION FOUND ? — YES
33 NO — RETURN CHANGE FREQ. COMMAND TO MOBILE
34 HANDOFF REQUEST RECEIVED AGAIN ? — NO
35 YES — DETERMINE NEXT BASE STATION USING FIELD STRENGTHS DATA
36 RETURN HANDOFF COMMAND TO MOBILE STATION, AND SEND CONNECTION SETUP COMMAND TO CONTROL STATION
37 CLEAR COMMAND RECEIVED FROM CONTROL STATION ? — NO
38 YES — CLEAR CONNECTION
39 CONNECTION SETUP COMMAND RECEIVED ? — No
40 YES — SETUP NEW CONNECTION
41 HANDOFF COMPLETE SIGNAL RECEIVED ? — NO
42 YES — SEND CONN. SETUP COMPLETE TO CONTROL STATION

STOP

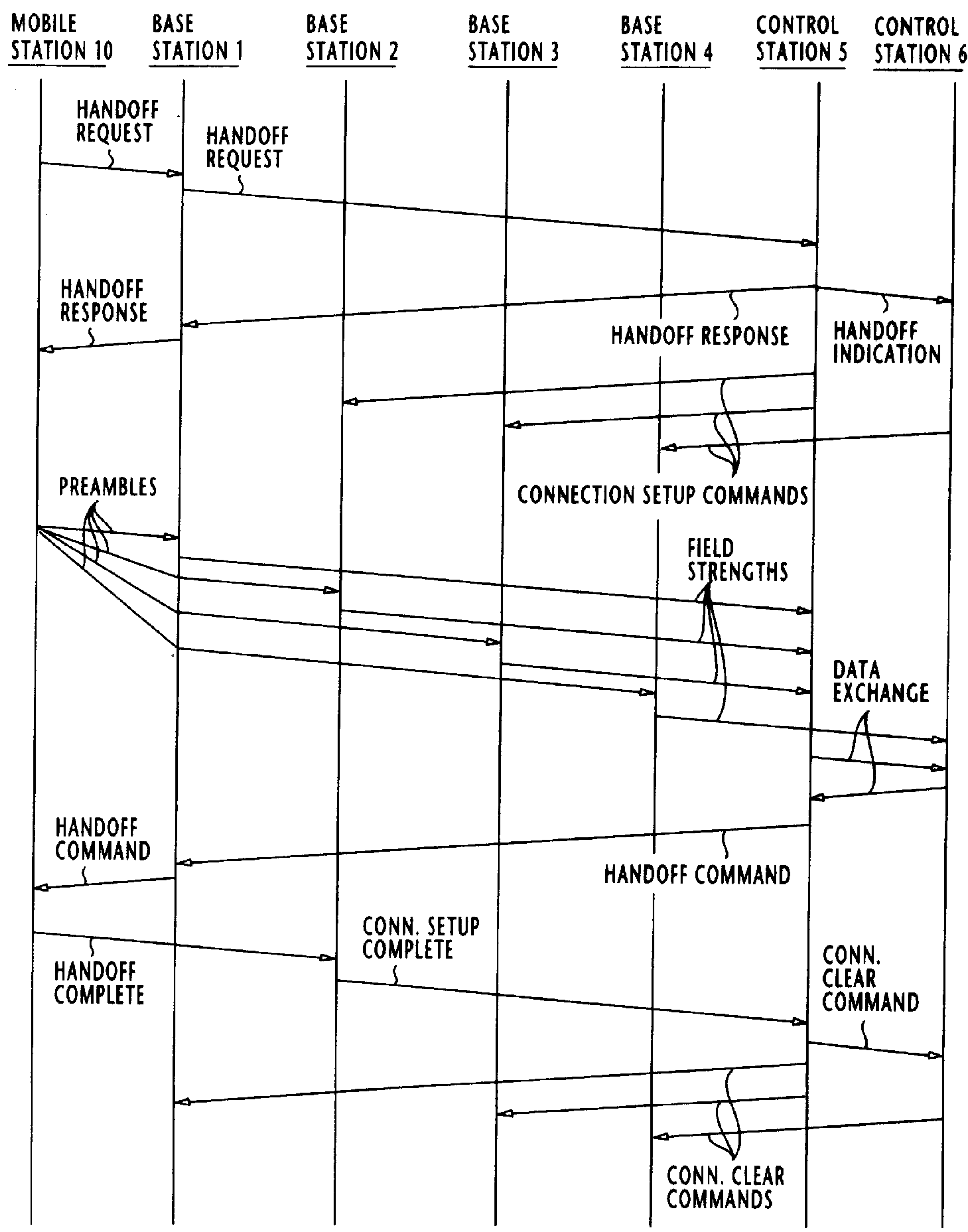
FIG. 2
PRIOR ART
MOBILE STATION 10
BASE STATION 1
BASE STATION 2
BASE STATION 3
BASE STATION 4
CONTROL STATION 5
CONTROL STATION 6
HANDOFF REQUEST
HANDOFF REQUEST
HANDOFF RESPONSE
HANDOFF RESPONSE
HANDOFF INDICATION
CONNECTION SETUP COMMANDS
PREAMBLES
FIELD STRENGTHS
DATA EXCHANGE
HANDOFF COMMAND
HANDOFF COMMAND
CONN. SETUP COMPLETE
HANDOFF COMPLETE
CONN. CLEAR COMMAND
CONN. CLEAR COMMANDS

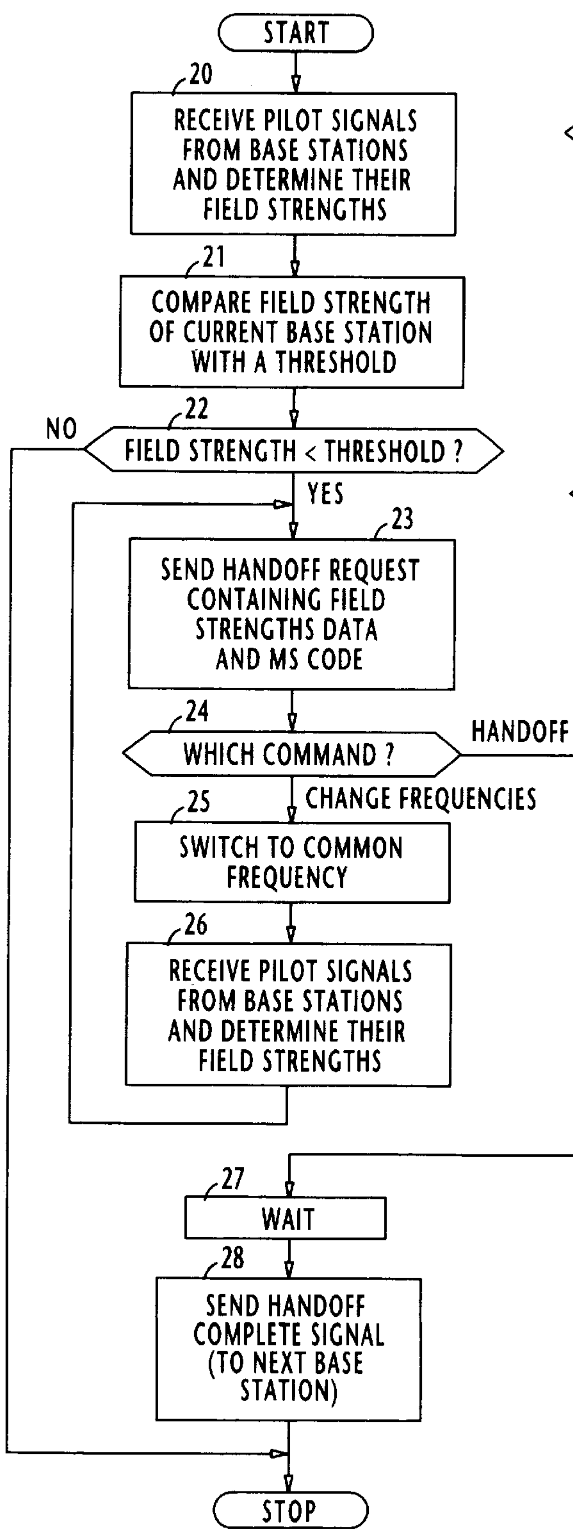
FIG. 3
MOBILE STATION
START
20
RECEIVE PILOT SIGNALS FROM BASE STATIONS AND DETERMINE THEIR FIELD STRENGTHS
21
COMPARE FIELD STRENGTH OF CURRENT BASE STATION WITH A THRESHOLD
22
FIELD STRENGTH < THRESHOLD ?
NO
YES
23
SEND HANDOFF REQUEST CONTAINING FIELD STRENGTHS DATA AND MS CODE
24
WHICH COMMAND ?
HANDOFF
CHANGE FREQUENCIES
25
SWITCH TO COMMON FREQUENCY
26
RECEIVE PILOT SIGNALS FROM BASE STATIONS AND DETERMINE THEIR FIELD STRENGTHS
27
WAIT
28
SEND HANDOFF COMPLETE SIGNAL (TO NEXT BASE STATION)
STOP

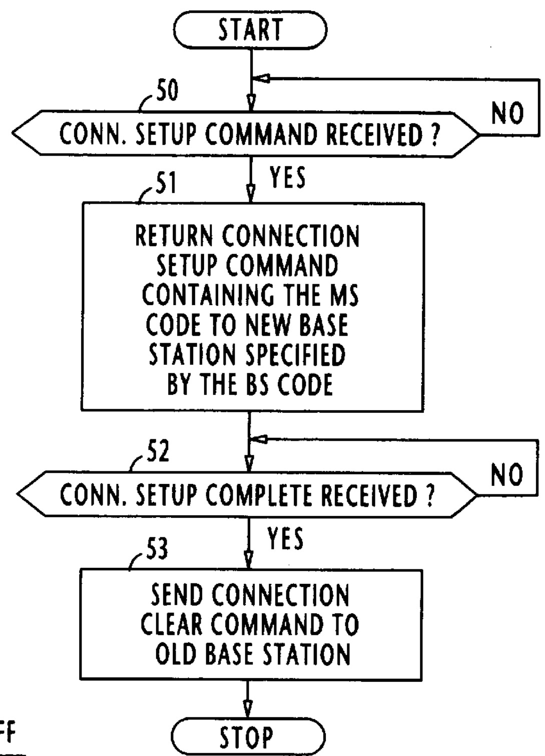
FIG. 5
CONTROL STATION
START
50
CONN. SETUP COMMAND RECEIVED ?
NO
YES
51
RETURN CONNECTION SETUP COMMAND CONTAINING THE MS CODE TO NEW BASE STATION SPECIFIED BY THE BS CODE
52
CONN. SETUP COMPLETE RECEIVED ?
NO
YES
53
SEND CONNECTION CLEAR COMMAND TO OLD BASE STATION
STOP

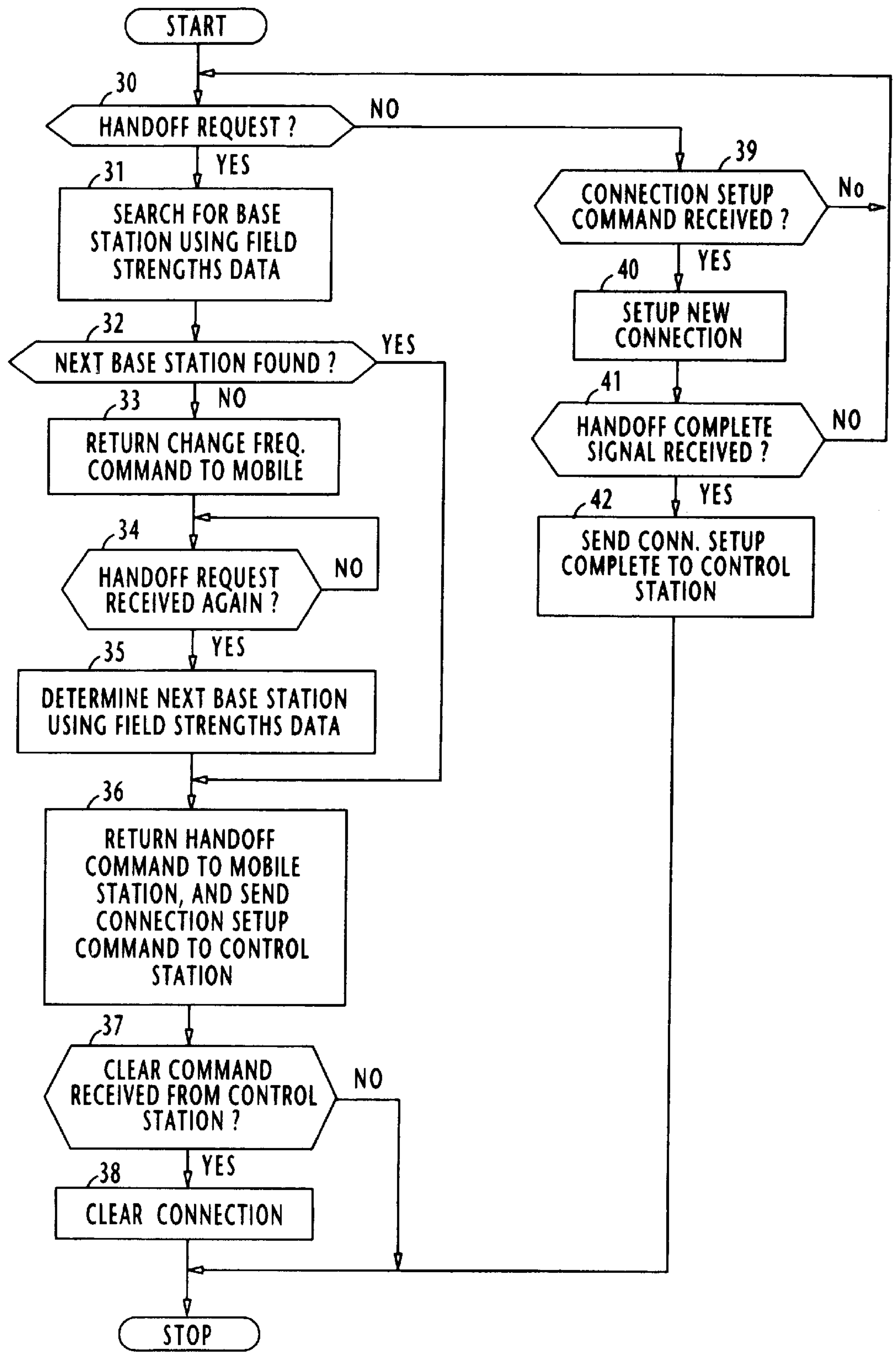
FIG. 4
BASE STATION
START
30
HANDOFF REQUEST ?
NO
YES
31
SEARCH FOR BASE STATION USING FIELD STRENGTHS DATA
32
NEXT BASE STATION FOUND ?
YES
33
NO
RETURN CHANGE FREQ. COMMAND TO MOBILE
34
HANDOFF REQUEST RECEIVED AGAIN ?
NO
35
YES
DETERMINE NEXT BASE STATION USING FIELD STRENGTHS DATA
36
RETURN HANDOFF COMMAND TO MOBILE STATION, AND SEND CONNECTION SETUP COMMAND TO CONTROL STATION
37
CLEAR COMMAND RECEIVED FROM CONTROL STATION ?
NO
38
YES
CLEAR CONNECTION
STOP
39
CONNECTION SETUP COMMAND RECEIVED ?
No
40
YES
SETUP NEW CONNECTION
41
HANDOFF COMPLETE SIGNAL RECEIVED ?
NO
42
YES
SEND CONN. SETUP COMPLETE TO CONTROL STATION

LOW TRAFFIC HANDOFF METHOD FOR CDMA CELLULAR NETWORK USING DIFFERENT FREQUENCIES AMONG BASE STATIONS

BACKGROUND OF THE INVENTION

1. Field of the Invention

The present invention generally relates to cellular communication networks, and more specifically to a handoff method for code division multiple access (CDMA) cellular communication networks when a mobile station is communicating with a first base station using a frequency which is different from the frequency of a second base station.

2. Description of the Related Art

Japanese Laid-Open Patent Specification Hei-8-149551 discloses a handoff technique for a CDMA cellular communication system which addresses a problem associated with a mobile station making a handoff attempt from a first base station to a second base station whose frequency is different from the frequency of the first base station. However, this prior art requires a high volume of control data to be exchanged between the base stations and a control station. If handoffs occur frequently, high-speed transmission media would be required between the base stations and the control station to prevent the control traffic from adversely affecting normal communication traffic. In addition, during handoffs the mobile stations are required to transmit preamble sequences as a test signal with such a strength that surrounding base stations can receive and determine their field strengths. The transmission of such test signals would dissipate the battery of a mobile station and shorten the usable lifetime of the battery.

SUMMARY OF THE INVENTION

It is therefore an object of the present invention to provide a handoff method for a CDMA cellular communication network which prevents handoff operations from adversely affecting normal communication traffic. According to the present invention, there is provided a handoff method for a code division multiple access cellular communication network, wherein a plurality of base stations are connected to a control station and share a first, common frequency and wherein a first base station has a second frequency in addition to the common frequency. According to the handoff method of this invention, a mobile station receives a pilot signal from the first base station over the second frequency when it has established a connection thereto, and transmits a first handoff request message when the field strength of the pilot signal drops below a predefined threshold. The first base station receives the first handoff request message and returns a change-frequencies command message to the mobile station. The mobile station responds to the change-frequencies command message from the first base station for switching to the common frequency and receives pilot signals from more than one base station over the common frequency, and transmits a second handoff request message containing a list of field strengths of the pilot signals. The first base station, on receiving the second handoff request message from the mobile station, makes a search through the list of field strengths contained in the received message and returns a handoff command message to the mobile station and a connection setup command message to the control station if a second base station appropriate for handoff is found. The control station responds to the connection setup command message from the first base station for instructing the second base station to establish a connection to the mobile station. The mobile station responds to the handoff command message from the first base station for instructing the second base station to transmit a connection setup complete message to the control station, which responds to it by instructing the first base station to clear the connection to the mobile station.

BRIEF DESCRIPTION OF THE DRAWINGS

The present invention will be described in further detail with reference to the accompanying drawings, in which:

FIG. 2 is a time sequence diagram of a prior art handoff procedure that occurs when different frequencies are used between base stations;

FIG. 3 is a flowchart of the handoff operation of a mobile station;

FIG. 4 is a flowchart of the handoff operation of a base station;

FIG. 5 is a flowchart of the handoff operation of a control station; and

DETAILED DESCRIPTION

Figure 1:
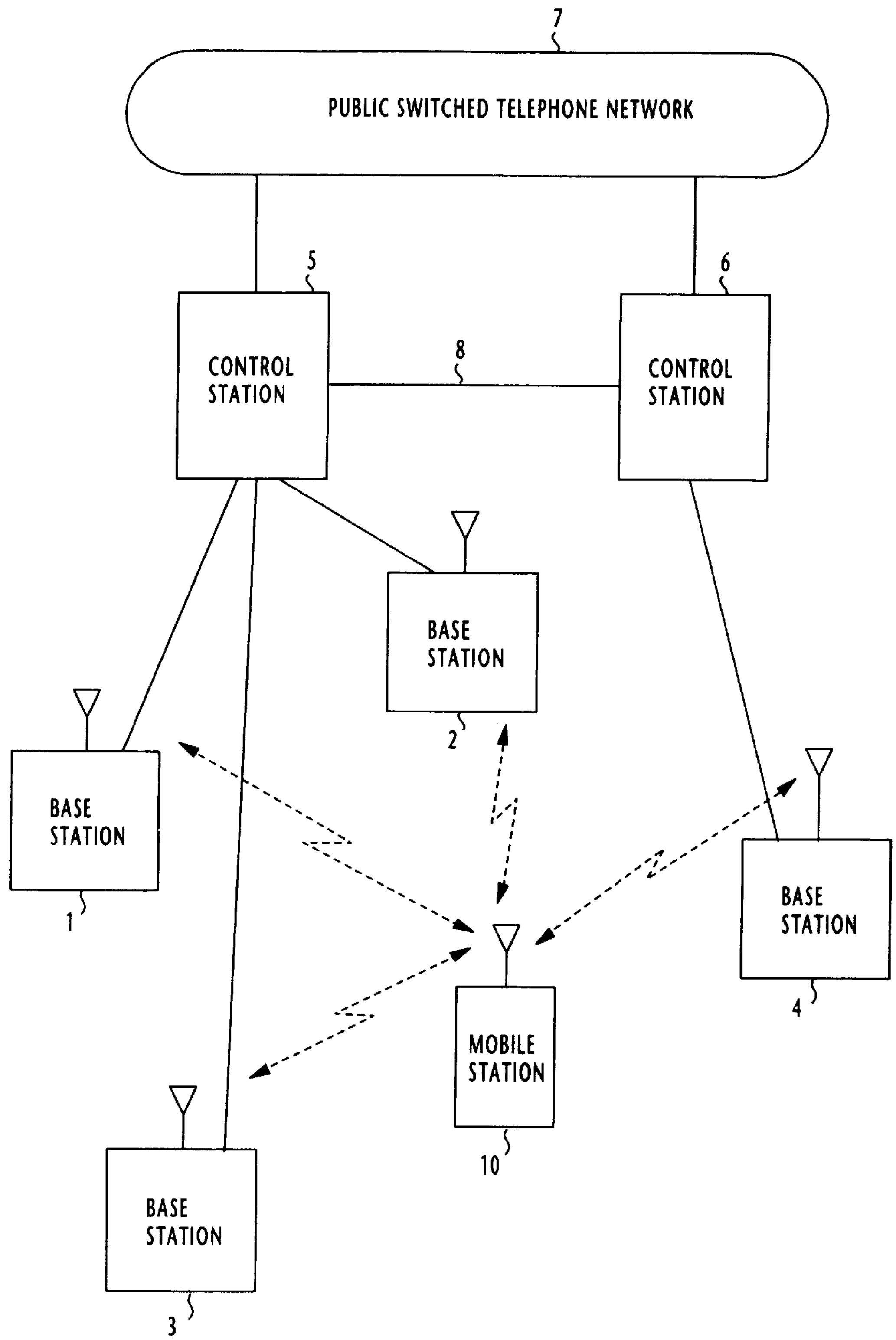
FIG. 1 is a block diagram of a CDMA cellular mobile communication network of the invention.

Referring to FIG. 1, a CDMA (code-division multiple access) cellular mobile communication network of the present invention is schematically illustrated. Base stations 1 to 4 are provided, of which base stations 1 to 3 are connected by land-lines to a control station 5 and base station 4 is connected to another control station 6. Both control stations are connected to a public switched telephone network 7. They are also interconnected by a dedicated communication link 8 for communication during handoff.

It is assumed that the base station 1 covers a thickly populated area in comparison with the other base stations, and so it is assigned two frequencies, one of which is a common frequency shared with the other base stations which are assigned the common frequency only. Wireless communication may proceed between a mobile station 10 and the base stations when the mobile station moves around and produces a situation appropriate for handoff Mobile station 10 is constantly measuring the field strengths of pilot signals transmitted from the surrounding base stations to produce a list of field strengths. These pilot signals are transmitted at regular intervals on each of the assigned frequencies at mutually exclusive times so that the pilot signals of each frequency do not overlap with each other. Each pilot signal contains the identification number of the transmitting base station and system data. When the mobile station 10 establishes a communication, it searches through the list of field strengths and determines the base station 1, for example, as it is sending the strongest signal and receives system data from the pilot signal of this base station. By using the system data, the mobile station 10 synchronizes itself to a specified frequency and a specified CDMA channel and begins communication with the base station 1 over the synchronized channel. Mobile station 10 formulates a handoff request message with the field strengths data along with the mobile's identification number when the field strength of a pilot signal from the currently communicating base station drops below a predefined threshold level, and transmits the handoff request message to the current base station.

If the frequency currently used by the mobile station 10 is different from the common frequency, the procedure associated with this handoff is different from the usual "soft" handoff characteristic to the CDMA system. In this case, the handoff procedure is between different frequencies.

Before proceeding with the detailed description of the present invention, it may be useful to provide an explanation of the prior art "different-frequency" handoff procedure in the CDMA network of FIG. 1 with reference to the time sequence diagram shown in FIG. 2.

When the field strength of the pilot signal from this base station drops below the threshold level, the mobile station 10 transmits a handoff request message to the base station 1, which hands it over to the control station 5. Control station 5 analyzes the field strengths data of the mobile station and finds no appropriate base station for handoff since the frequency used by the base stations other than the base station 10 is the common frequency different from the current frequency of the mobile station 10. Control station 5 then returns a handoff response to the base station 1 to cause it to instruct the mobile station 10 to return a second handoff request message containing a preamble sequence at the common frequency. Immediately following the transmission of the handoff response, the control station 5 transmits a connection setup command message to the base stations 2 and 3 to cause them to establish radio links to the mobile station 10. At the same time, the control station 5 sends a handoff indication signal to the control station 6 to send a connection setup command message to the base station 4.

In response to the handoff response from the base station 1, the mobile station 10 synchronizes itself to the common frequency and sends a second handoff request message containing its identification number and a preamble sequence. All base stations receive the second handoff request message. Each base station measures the field strength of the respective preamble sequence and transmits it to the associated control station. Control stations 5 and 6 exchange their received field strength data. If the control station 5 finds the base station 2, for example, as one transmitting the strongest signal, it takes control and sends a handoff command message to the current base station 1, indicating that a the base station 2 is the target station for the handoff operation. Base station 1 relays this command message to the mobile station 10, so that the latter knows that the base station 2 is the next station. Mobile station 10 now sends a handoff complete message to the base station 2. Base station 2 responds to the handoff complete message by transmitting a connection complete message to the control station 5, indicating that a radio link is established between the mobile station 10 and the base station 2. On receiving this connection complete message, the control station 5 commands the base stations 1 and 3 to dear their connections to the mobile station and also directs the control station 6 to clear the connection of the base station 4 to the mobile station.

It is seen that in the prior art a substantial amount of control data is exchanged between base stations and control stations. This would adversely affect the normal traffic between base stations and control stations when handoff operations are frequently performed. In addition, during handoffs the mobile stations are required to transmit preamble sequences as a test signal with such a strength that surrounding base stations can receive and determine their field strengths. The transmission of such test signals would dissipate the battery of a mobile station and shorten the usable lifetime of the battery.

The following is a description of the present invention with the aid of flowcharts shown in FIGS. 3, 4 and 5.

In FIG. 3, prior to a handoff routine, the mobile station 10 is monitoring pilot signals sequentially transmitted from base stations 1 to 4 on an initial frequency when it is in communication with the base station 1 to determine their field strengths (step 20). If the initial frequency is not the common frequency, the mobile station 10 will receive only one pilot signal, i.e., the one from the base station 1 and determine its field strength. At step 21, the mobile station compares the field strength of the pilot signal from the current base station with a predefined threshold level. If the level of this field strength is not lower than the threshold level (step 22), flow proceeds to the end of the handoff routine. If it is lower than the threshold level, flow proceeds to step 23 to send a handoff request message to the base station 1, containing a list of the field strengths and the mobile's identification (MS) code, and waits for a command message (step 24). If the mobile station is not currently using the common frequency, the list: contains only the field strength of the pilot signal of base station 1.

Referring briefly to FIG. 4, each base station is monitoring signals from the mobile station and the associated control station (step 30). If a handoff request message is transmitted from the mobile station, the current base station will receive it at step 30 and proceeds to step 31 to search through the list of field strengths contained in the received message for a next base station appropriate for handoff. If such a base station is not found in the list (step 32), flow proceeds to step 33 to return a change-frequencies command message to the requesting mobile station to wait for a second handoff request (step 34). This will take place when the mobile station is not currently using the common frequency.

Reverting to FIG. 3, the mobile station receives the change-frequencies command message at step 24, and proceeds to step 25 to switch to the common frequency. At step 26, the mobile station monitors pilot signals from base stations 1 to 4 and determines their field strengths. Since all the base stations use the common frequency, the mobile station receives pilot signals from all base stations and produces a list of their field strengths. Flow returns from step 26 to step 23 to send a second handoff request message containing the MS code and the list of field strengths and waits for the next command message (step 24).

When the current base station receives the second handoff request message at step 34 (FIG. 4), it proceeds to step 35 to determine a next base station transmitting the signal whose strength is the highest of the strengths contained in the received message. Flow proceeds to step 36 where the current base station returns a handoff command message to the mobile station, containing the BS code of the next base station and a new channel number. In addition, it sends a connection setup command message to the associated control station to wait for a connection clear command message therefrom (step 37). This connection setup message contains the MS code of the mobile station 10, the new channel number and the BS code of the next base station.

If the mobile station 10 is using the common frequency when a handoff is attempted, the list of field strengths contains valid data of all base stations. In such instances, an appropriate base station will be found at step 32 and flow proceeds to step 36 to return a handoff command message to the mobile station.

If a clear command message is received from the associated control station, the current base station proceeds to step 38 to clear the connection between the mobile station 10 and the associated control station, and terminates its handoff routine.

In FIG. 3, the mobile station 10 is waiting for a command message at step 24. This command message is the handoff command message returning from the current base station at step 36. Mobile station 10 proceeds from step 24 to step 27 to wait a predetermined period and send a handoff complete message, at step 28, over the new channel specified by the handoff command message so that the next base station specified by the BS code can receive it. Mobile station 10 then terminates its handoff routine.

Meanwhile, each control station is monitoring signals sent from the serving base stations to receive a connection setup message at step 50 as shown in FIG. 5. When the connection setup message arrives, the control station proceeds to step 51 to return a copy of the received message to the base station specified by the BS code contained in the received message to instruct it to establish a radio link to the mobile station 10 and waits for a connection setup complete message from the specified base station (step 52).

As illustrated in FIG. 4, the new base station specified by the BS code receives the connection setup command message from the associated control station (step 39) and proceeds to step 40 to establish a new connection between the mobile station 10 and the control station in order to receive the handoff complete message from the mobile station (step 41).When the new base station receives the handoff complete message from the mobile station 10, it sends a connection setup complete message to the control station (step 42) and terminates its handoff routine.

Therefore, when the control station receives the connection setup complete message from the new base station at step 52, it sends a connection clear command message to the old base station (step 53) and terminates its handoff routine.

Therefore, when the old base station receives the connection clear message at step 37, it clears the connection between the mobile station 10 and the control station (step 38), and terminates its handoff routine.

Figure 6:
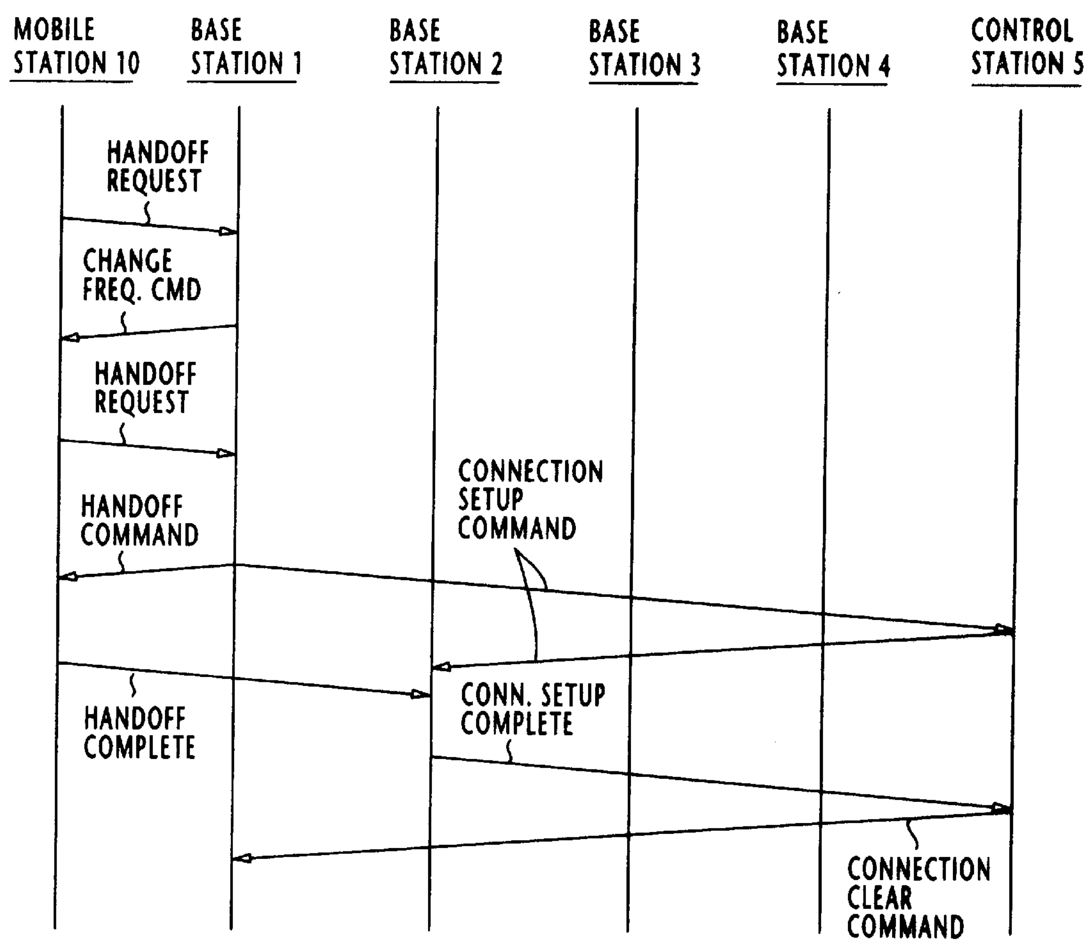
FIG. 6 is a time sequence diagram of the handoff procedure of the present invention.

FIG. 6 shows in a time sequence diagram a sequential operation of the network in which it is assumed that the base stations 1 and 2 are old and new base stations, respectively, and that the mobile station 10 is using a frequency other than the common frequency which is shared among the base stations 1 to 4. Mobile station 10 sends a first handoff request message when the field strength of the pilot signal from the base station 1 drops below the threshold level (steps 22, 23). This request message is received at base station 1 (step 30), which fails to find an appropriate base station for handoff and returns a change-frequencies command message to the mobile station (steps 31 to 33). Upon receipt of the change-frequencies command message (step 24), the mobile station switches to the common frequency (step 25) to determine the field strengths of pilot signals received from all the base stations over the common frequency (step 26) and sends a second handoff request message (step 23).

On receiving the second handoff request message (step 34), the base station 1 uses the field strengths data of the received message to determine the base station 2 as a new base station (step 35) and returns a handoff command message to the mobile station 10 and sends a connection setup command message to the control station 5. In response, the control station 5 instructs the base station 2 to establish a connection to the mobile station (steps 50, 51). Mobile station 10, on the other hand, transmits a handoff complete message to the base station 2. On receiving this message, the new base station 2 sends a connection setup complete message to the control station 5, so that the latter directs the old base station 1 to clear its connection to the mobile station (steps 39 to 42). If the common frequency is used at the moment a handoff is attempted, the initial handoff request message contains field strength data of all base stations and the base station 1 determines the new base station from the received data and issues a handoff command message to the mobile station, thus eliminating the need to exchange the change-to-frequencies command message and the second handoff request message.

It is seen that the handoff control traffic between base stations and a control station is significantly reduced in the present invention.

What is claimed is:

1. A handoff method for a code division multiple access cellular communication network, wherein a plurality of base stations share a first, common frequency, a first base station of said plurality of base stations has a second frequency in addition to the common frequency, said plurality of base stations being connected to a control station, the method comprising:

a) receiving, at a mobile station, a pilot signal from the first base station over the second frequency when the mobile station has established a connection thereto, and transmitting a first handoff request message when field strength of the pilot signal drops below a predefined threshold;

b) receiving, at the first base station, the first handoff request message, said first base station returning a change-frequencies command message to the mobile station;

c) receiving, at the mobile station, said change-frequencies command message from the first base station for switching to the common frequency and receiving pilot signals from more than one base station over the common frequency, and transmitting a second handoff request message containing a list of field strengths of the pilot signals;

d) receiving, at the first base station, the second handoff request message from the mobile station, making a search through the list of field strengths contained in the received message, returning a handoff command message to the mobile station and transferring a connection setup command message to said control station if a second base station appropriate for handoff is found;

e) receiving, at the control station, the connection setup command message from the first base station for instructing the second base station to establish a connection to the mobile station;

f) receiving, at the mobile station, the handoff command message from the first base station for instructing the second base station to transmit a connection setup complete message to the control station; and g) receiving, at the control station, the connection setup complete message from the second base station for instructing the first base station to clear the connection to the mobile station.

2. A code division multiple access cellular communication network comprising:

a control station;

a plurality of base stations connected to said control station, wherein said plurality of base stations share a first, common frequency, and a first base station of said plurality of base stations has a second frequency in addition to the common frequency; and a mobile station for receiving a pilot signal from the first base station over the second frequency when the mobile station has established a connection thereto, and transmitting a first handoff request message when field strength of the pilot signal drops below a predefined threshold, the first base station being responsive to the first handoff request message from the mobile station for returning thereto a change-frequencies command message, the mobile station receiving the change-frequencies command message for switching to the common frequency and receiving pilot signals from more than one base station over the common frequency, and transmitting a second handoff request message containing a list of field strengths of the pilot signals, the first base station being responsive to the second handoff request message from the mobile station, making a search through the list of field strengths contained in the received message and returning a handoff command message to the mobile station and transmitting a connection setup command message to said control station if a second base station appropriate for handoff is found, the control station being responsive to the connection setup command message from the first base station for instructing the second base station to establish a connection to the mobile station, the mobile station being responsive to the handoff command message from the first base station for transmitting a handoff complete message to the second base station instructing the second base station to transmit a connection setup complete message to the control station, and the control station being responsive to the connection setup complete message from the second base station for instructing the first base station to dear the connection to the mobile station.

3. A handoff method for each of a plurality of base stations of a code division multiple access cellular communication network, wherein the plurality of base stations are connected to a control station and share a first, common frequency, wherein a first base station of said plurality of base stations has a second frequency in addition to the common frequency, and wherein a mobile station receives pilot signals over the second frequency when the mobile station has established a connection to the first base station and determines field strengths of the pilot signals and compares the field strength of the pilot signal from the first base station with a predefined threshold level, and transmits a first handoff request message containing a list of said field strengths to the first base station when said field strength is lower than the threshold level, and wherein the mobile station is responsive to a change-frequencies command message for receiving pilot signals over the common frequency to determine field strengths of the pilot signals and transmits a second handoff request message containing a list of the field strengths, said mobile station further transmitting a handoff complete message in response to a handoff command message from the first base station, the method comprising:

a) receiving the first handoff request message over the second frequency when each base station is functioning as said first base station and determining whether or not there is an appropriate base station for handoff by using contents of the list of the received message;

b) returning said change-frequencies command message to the mobile station if an appropriate base station is not present;

c) receiving the second handoff request message and determining whether or not there is an appropriate base station for handoff by using contents of the list of the received message;

d) returning said handoff command message to the mobile station and transmitting a connection setup command message to the control station if an appropriate base station is present, and identifying the appropriate base station as a second base station;

e) receiving a connection clear command message which is sent from the control station in response to a connection setup complete message from the second base station and clearing the connection between the first base station and the mobile station; and f) receiving a connection setup command message from the control station when each base station is functioning as said second base station, establishing a connection between the second base station and the mobile station and receiving the handoff complete message from the mobile station for instructing the control station to transmit said connection clear command message to the first base station.

4. The method of claim 1, wherein the second base station is instructed to establish a connection to the mobile station by outputting said connection setup command message from said control station to said second base station.

5. The method of claim 1, wherein the method further comprises outputting a connection clear command from the control station to the first base station to clear the connection to the mobile station.

6. The method of claim 1, wherein the second base station is instructed to transmit said connection setup complete message by the mobile station outputting a handoff complete message to the second base station.

* * * * *